(12) United States Patent
Seo et al.

(10) Patent No.: US 8,482,532 B2
(45) Date of Patent: Jul. 9, 2013

(54) MOBILE COMMUNICATION TERMINAL HAVING PROXIMITY SENSOR AND DISPLAY CONTROLLING METHOD THEREIN

(75) Inventors: Min Cheol Seo, Gyeonggi-do (KR); Seon Hwi Cho, Incheon-si (KR)

(73) Assignee: LG Electronics Inc., Seoul (KR)

( * ) Notice: Subject to any disclaimer, the term of this patent is extended or adjusted under 35 U.S.C. 154(b) by 1073 days.

(21) Appl. No.: 12/476,213

(22) Filed: Jun. 1, 2009

(65) Prior Publication Data

US 2009/0295715 A1    Dec. 3, 2009

(30) Foreign Application Priority Data

Jun. 2, 2008  (KR) .......................... 10-2008-0051612
Jun. 12, 2008 (KR) .......................... 10-2008-0055357

(51) Int. Cl.
*G06F 3/03* (2006.01)

(52) U.S. Cl.
USPC .......................................... 345/173; 345/156

(58) Field of Classification Search
USPC .................. 345/168, 169, 173, 174, 156, 157
See application file for complete search history.

(56) References Cited

U.S. PATENT DOCUMENTS

| 7,231,229 | B1 * | 6/2007 | Hawkins et al. | 345/173 |
| 7,239,249 | B2 * | 7/2007 | Stimson et al. | 345/173 |
| 2006/0284849 | A1 * | 12/2006 | Grant et al. | 345/173 |
| 2009/0058823 | A1 * | 3/2009 | Kocienda | 345/173 |
| 2009/0122022 | A1 * | 5/2009 | Park et al. | 345/173 |
| 2009/0289902 | A1 * | 11/2009 | Carlvik et al. | 345/173 |

* cited by examiner

*Primary Examiner* — Regina Liang
(74) *Attorney, Agent, or Firm* — Lee, Hong, Degerman, Kang & Waimey

(57) ABSTRACT

A mobile communication terminal having a function of detecting a proximity touch and a display controlling method therein are disclosed. The present invention includes a touchscreen configured to display prescribed data, the touchscreen detecting a real touch or a proximity touch to a surface contact point, a proximity sensor outputting a proximity signal corresponding to a proximity position of a proximate object, and a controller controlling an implementation of an operation associated with the prescribed data displayed on the touchscreen according to the proximity signal detected by the proximity sensor.

20 Claims, 23 Drawing Sheets

MOBILE COMMUNICATION TERMINAL HAVING PROXIMITY SENSOR AND DISPLAY CONTROLLING METHOD THEREIN

Pursuant to 35 U.S.C. §119(a), this application claims the benefit of earlier filing date and right of priority to Korean Application Nos. 10-2008-0051612, filed on Jun. 2, 2008, and 10-2008-0055357 filed on Jun. 12, 2008, the contents of which are hereby incorporated by reference herein in their entirety.

BACKGROUND OF THE INVENTION

1. Field of the Invention

The present invention relates to a mobile communication terminal, and more particularly, to a mobile communication terminal having a proximity sensor and a method of controlling a display using the same. Although the present invention is suitable for a wide scope of applications, it is particularly suitable for detecting a proximity touch.

2. Discussion of the Related Art

Recently, a touchscreen has been applied to a terminal. A user directly touches a surface of the touchscreen to implement an operation intended by the user.

SUMMARY OF THE INVENTION

Accordingly, the present invention is directed to a mobile communication terminal and display controlling method therein that substantially obviate one or more problems due to limitations and disadvantages of the related art.

An object of the present invention is to provide a mobile communication terminal and displaying method using the same, by which a proximity touch is detected as well as a direct touch to operate the mobile communication terminal according to a result of the detection.

Another object of the present invention is to provide a mobile communication terminal and displaying method using the same, by which a display is performed in a different way according to a distance recognition of each location from a contact point.

Another object of the present invention is to provide a mobile communication terminal and displaying method using the same, by which a proximity touch is recognized to control a display of avatar and an operation associated with the avatar.

A further object of the present invention is to provide a mobile communication terminal and displaying method using the same, by which a proximity touch is recognized to facilitate a text input.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile communication terminal according to the present invention is characterized in that a character is displayed on an input window before pressing the character.

To achieve these objects and other advantages and in accordance with the purpose of the invention, as embodied and broadly described herein, a mobile communication terminal according to the present invention is characterized in that a specific operation is performed according to a distance between an avatar and a pointer in proximity to the avatar.

A mobile communication terminal according to the present invention is further characterized in controlling a displayed character according to a distance from a contact point.

A mobile communication terminal according to the present invention is further characterized in displaying a pre-displayed character in a form different from that of a previously-inputted character.

A mobile communication terminal according to the present invention is further characterized in controlling a pre-displayed character according to a sustained time of a proximity touch state.

A mobile communication terminal according to the present invention is further characterized in controlling a pre-displayed character according to a proximity distance from a contact point.

A mobile communication terminal according to the present invention is further characterized in controlling a level and duration of vibration according to an outputted character.

A mobile communication terminal according to the present invention is further characterized in processing a real touch to a contact point into an input of a corresponding character or processing a release of a proximity touch state into an input of a corresponding character.

A mobile communication terminal according to the present invention is further characterized in displaying a character corresponding to a shifted position on a character input window in advance if a proximity touch is shifted to another button by being sustained.

A mobile communication terminal according to the present invention is further characterized in that avatars displayed on a touchscreen according to a proximity distance of a pointer implement different actions, respectively.

A mobile communication terminal according to the present invention is further characterized in displaying at least one icon for implementing a connected operation around an avatar displayed on a touchscreen according to a proximity distance of a pointer.

A mobile communication terminal according to the present invention is further characterized in that an icon includes at least one of a short text message icon, a multimedia message icon, an e-mail icon and an instant messenger icon.

A mobile communication terminal according to the present invention is further characterized in displaying an icon-related function in a pop-up form and controlling an operation according to a pop-up menu selection to be implemented if a pointer is detected as located within a prescribed distance over the icon.

A mobile communication terminal according to the present invention is further characterized in displaying a pop-up window indicating information on a person around an avatar if a pointer touches a human avatar or displaying a menu for fostering an avatar as a pop-up menu if a proximity touch is performed on an animal or plant avatar.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or like parts.

In the following description, a mobile communication terminal having a proximity sensor and a display controlling method using the same according to one embodiment of the present invention are explained.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
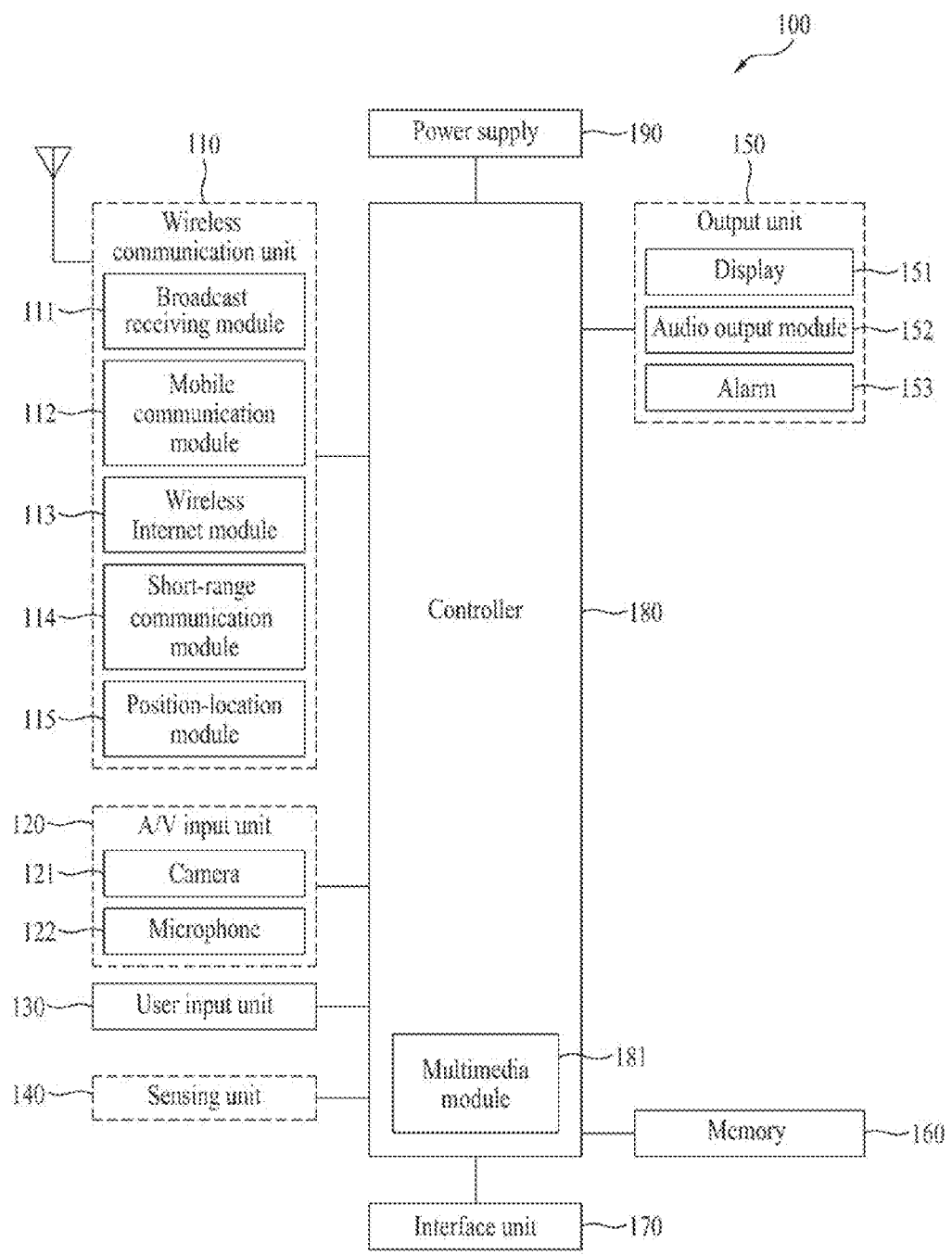
FIG. 1 is a block diagram of a terminal according to one embodiment of the present invention.

FIG. 1 is a block diagram of a mobile terminal 100 in accordance with an embodiment of the present invention. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For example, the wireless communication unit 110 typically includes one or more components which permit wireless communication between the mobile terminal 100 and a wireless communication system or network within which the mobile terminal is located. In case of non-mobile terminals, the wireless communication unit 110 can be replaced with a wire communication unit. The wireless communication unit 110 and wire communication unit can be commonly referred to as a communication unit. A broadcast receiving module 111 receives a broadcast signal and/or broadcast associated information from an external broadcast managing entity via a broadcast channel. The broadcast channel may include a satellite channel and a terrestrial channel. The broadcast managing entity generally refers to a system which transmits a broadcast signal and/or broadcast associated information.

At least two broadcast relieving modules 111 can be provided to the mobile terminal 100 in pursuit of simultaneous receptions of at least two broadcast channels or broadcast channel switching facilitation.

Examples of broadcast associated information include information associated with a broadcast channel, a broadcast program, a broadcast service provider, etc. For example, the broadcast associated information may include an electronic program guide (EPG) of digital multimedia broadcasting (DMB) and electronic service guide (ESG) of digital video broadcast-handheld (DVB-H).

The broadcast signal may be implemented, for example, as a TV broadcast signal, a radio broadcast signal, and a data broadcast signal. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals is also possible. If desired, data received by the broadcast receiving module 111 may be stored in a suitable device, such as a memory 160.

A mobile communication module 112 communicates wireless signals with one or more network entities such as a base station or Node-B. Such signals may represent, for example, audio, video, multimedia, control signaling, and data.

A wireless internet module 113 supports Internet access for the mobile terminal 100. This module may be internally or externally coupled to the mobile terminal 100. Suitable technologies for wireless internet may include, but are not limited to, WLAN (Wireless LAN) (Wi-Fi), Wibro (Wireless broadband), Wimax (World Interoperability for Microwave Access), and HSDPA (High Speed Downlink Packet Access). The wireless internet module can be replaced with a wire internet module in non-mobile terminals. The wireless internet module 113 and wire internet module may be commonly referred to as an internet module.

A short-range communication module 114 facilitates relatively short-range communications. Suitable technologies for short-range communication my include, but are not limited to, radio frequency identification (RFID), infrared data association (IrDA), ultra-wideband (UWB), as well as the networking technologies commonly referred to as Bluetooth and ZigBee.

A position-location module 115 identifies or otherwise obtains the location of the mobile terminal 100. This module may be implemented using, for example, global positioning system (GPS) components which cooperate with associated satellites, network components, and combinations thereof.

According to the current technology, the GPS module 115 is able to precisely calculate current 3-dimensional position information based on longitude, latitude and altitude by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

An audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video.

A microphone 122 receives an external audio signal while the portable device is in a particular mode, such as phone call mode, recording mode or voice recognition mode. This audio signal is processed and converted into digital data.

The portable device, and specifically the A/V input unit 120, typically includes assorted noise removing algorithms to remove noise generated in the course of receiving the external audio signal. Data generated by the A/V input unit 120 may be stored in the memory 160, utilized by the output unit 150, or transmitted via one or more modules of communication unit 110. If desired, two or more microphones and/or cameras may be used.

A user input unit 130 generates input data responsive to user manipulation of an associated input device or devices. Examples of such devices include a keypad, a dome switch, a touchpad such as static pressure/capacitance, a jog wheel and a jog switch. A specific example is one in which the user input unit 130 is configured as a touchpad in cooperation with a display, which will be described in more detail below.

A sensing unit 140 provides status measurements of various aspects of the mobile terminal 100. For example, the sensing unit may detect an open/close status of the mobile terminal 100, relative positioning of components such as a display and keypad of the mobile terminal, a change of position of the mobile terminal or a component of the mobile terminal, a presence or absence of user contact with the mobile terminal, orientation or acceleration/deceleration of the mobile terminal.

If the mobile terminal 100 is configured as a slide-type mobile terminal, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

An interface unit 170 is often implemented to couple the mobile terminal with external devices. Typical external devices include wired/wireless headphones, external chargers, power supplies, storage devices configured to store data such as audio, video, and pictures, as well as earphones and microphones. The interface unit 170 may be configured using a wired/wireless data port, audio input/output ports, video input/output port, a card socket for coupling to a memory card, a subscriber identity module (SIM) card, a user identity module (UIM) card, or removable user identity module (RUIM) card).

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

An output unit 150 generally includes various components that support the output requirements of the mobile terminal 100. A display 151 is typically implemented to visually display information associated with the mobile terminal 100. For example, if the mobile terminal 100 is operating in a phone call mode, the display will generally provide a user interface or graphical user interface that includes information associated with placing, conducting, and terminating a phone call. As another example, if the mobile terminal 100 is in a video call mode or a photographing mode, the display 151 may additionally or alternatively display images associated with these modes.

One particular implementation includes the display 151 configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display.

Some of the above displays can be configured transparent so that an external environment can be seen through the corresponding display. Such a display can be called a transparent display. As a representative example for the transparent display, there is a transparent LCD display or the like.

The mobile terminal 100 may include one or more of displays 151. An example of a two-display embodiment is one in which one display 151 is configured as an internal display viewable when the terminal is in an opened position and a second display 151 configured as an external display viewable in both the open and closed positions.

The touchscreen can be configured to detect a touch input pressure as well as a touch input position and size.

Meanwhile, a proximity sensor 141 can be provided within or around the touchscreen. The proximity sensor detects an object approaching a prescribed detecting surface or a presence or non-presence of an object existing around itself using an electromagnetic power or infrared rays without mechanical contact. Hence, the proximity sensor is superior to a contact sensor in lifespan and utilization.

Example for an operational principle of the proximity sensor is explained as follows. First of all, if an object approaches a sensor detecting surface while an oscillation circuit oscillates a sine radio frequency, an oscillation amplitude of the oscillation circuit attenuates or stops. This change is converted to an electric signal to detect a presence or non-presence of the object. So, even if any material except a metallic comes between the RF oscillation proximity sensor and the object, a proximity switch is able to detect the object to detect without interference with the material.

In spite of not providing the proximity sensor, if the touchscreen is electrostatic, it can be configured to detect the proximity of a pointer through an electric field change attributed to the proximity of the pointer.

So, in case that the pointer is placed in the vicinity of the touchscreen without being actually contacted with the touchscreen, it is able to detect a position of the pointer and a distance between the pointer and the touchscreen. For clarity and convenience of explanation, an action for enabling the pointer approaching the touchscreen to be recognized as placed on the touchscreen is named 'proximity touch' and an action of enabling the pointer to actually come into contact with the touchscreen is named 'contact touch'. And, a position, at which the proximity touch is made to the touchscreen using the pointer, means a position of the pointer vertically corresponding to the touchscreen when the pointer makes the proximity touch.

If the proximity sensor is used, it is able to sense a proximity touch and its pattern (e.g., proximity touch distance, proximity touch direction, proximity touch speed, proximity touch position, proximity touch moving state, etc.). And, it is also able to output information corresponding to the sensed proximity touch action and the proximity touch pattern to the touchscreen.

FIG. 1 further shows the output unit 150 having an audio output module 152 which supports the audio output requirements of the mobile terminal 100. The audio output module 152 is often implemented using one or more speakers, buzzers, other audio producing devices, and combinations thereof. The audio output module 152 functions in various modes such as call-receiving mode, call-placing mode, recording mode, voice recognition mode and broadcast reception mode. During operation, the audio output module 152 outputs audio relating to a particular function or status, such as call received, message received, or errors.

The output unit 150 is further shown having an alarm 153, which is commonly used to signal or otherwise identify the occurrence of a particular event associated with the mobile terminal 100. Typical events include call received, message received and user input received.

An example of a signal provided by the output unit 150 is tactile sensations. For example, the alarm 153 may be configured to vibrate responsive to the mobile terminal 100 receiving a call or message. As another example, vibration is provided by the alarm 153 responsive to receiving user input at the mobile terminal 100, thereby providing a tactile feedback mechanism. It is understood that the various signals provided by the components of output unit 150 may be separately performed or performed using any combination of such components.

A memory 160 is generally used to store various types of data to support the processing, control, and storage requirements of the mobile terminal 100. Examples of such data include program instructions for applications operating on the mobile terminal 100, contact data, phonebook data, messages, pictures, and video.

In the memory 160, use frequencies of the respective data (e.g., use frequency of each phone number, each message or each multimedia) can be stored together.

Moreover, data for various patterns of vibration and/or sound outputted in case of a touch input to the touchscreen can be stored in the memory 160.

As map information can be stored in the memory 160, user's convenience can be further provided in a manner of providing the map information to a user if necessary. Moreover, a recent use history or a cumulative use frequency of each menu in the mobile terminal can be stored in the memory 160.

The memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

A controller 180 typically controls the overall operations of the mobile terminal 100. For example, the controller 180 performs the control and processing associated with voice calls, data communications, instant message communication, video calls, camera operations and recording operations.

The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

A power supply 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments may also be implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

The mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal 100. However such teachings apply equally to other types of mobile terminals.

Figure 2:
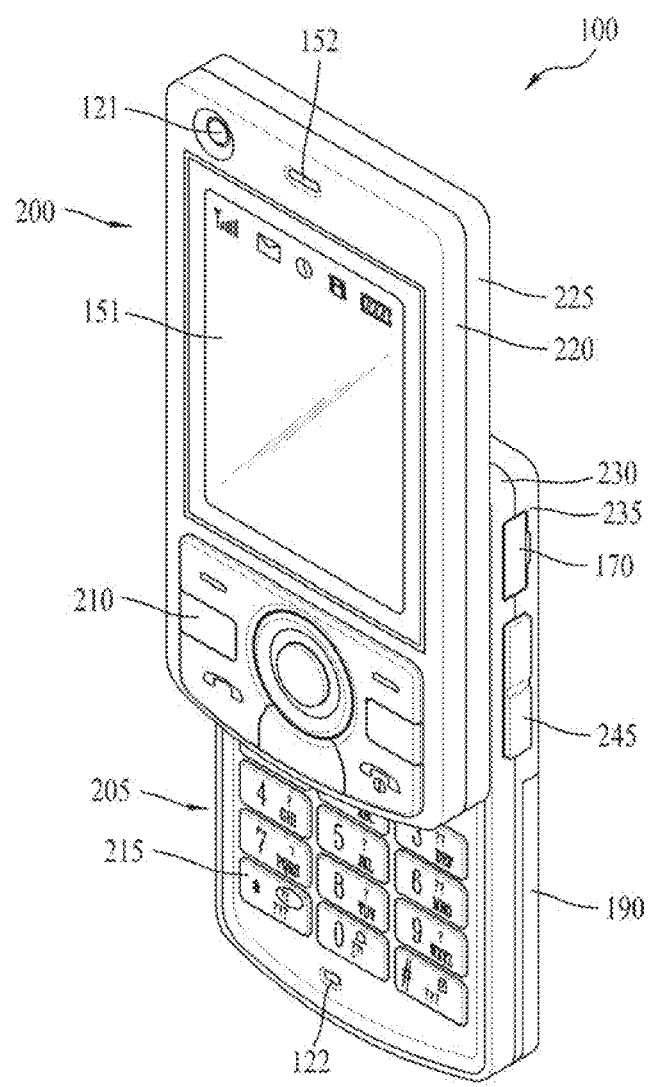
FIG. 2 is a front perspective diagram of a terminal according to one embodiment of the present invention.

FIG. 2 is a perspective view of a front side of a mobile terminal 100 according to an embodiment of the present invention. In FIG. 2, the mobile terminal 100 is shown having a first body 200 configured to slidably cooperate with a second body 205.

The user input unit 130 described in FIG. 1 may include a first input unit such as function keys and four directional keys 210, a second input unit such as keypad 215 and a third input unit such as side keys 245. The function keys 210 are associated with the first body 200, and the keypad 215 is associated with the second body 205. The keypad includes various keys such as numbers, characters, and symbols to enable a user to place a call, prepare a text or multimedia message, and otherwise operate the mobile terminal 100.

The first body 200 slides relative to the second body 205 between open and closed positions. Although not shown in drawings, in case of a folder-type mobile terminal, a first body thereof folds and unfolds relative to a second body thereof between open and closed positions. In addition, in case of a swing-type mobile terminal, a first body thereof swings relative to a second body thereof between open and closed positions.

In a closed position, the first body 200 is positioned over the second body 205 in such a manner that the keypad 215 is substantially or completely obscured by the first body 200. In the open position, user access to the keypad 215 is possible. The function keys 210 are conveniently configured for a user to enter commands such as start, stop and scroll.

The mobile terminal 100 is operable in either a standby mode, in which it is able to receive a call or message and to receive and respond to network control signaling or an active call mode. Typically, the mobile terminal 100 functions in the standby mode in the closed position and in an active mode in the open position. This mode configuration may be changed as required or desired.

The first body 200 is shown formed from a first case 220 and a second case 225. The second body 205 is shown formed from a first case 230 and a second case 235. The first case 230 and second case 235 are usually formed from a suitably rigid material, such as injection molded plastic, or formed using metallic material, such as stainless steel (STS) and titanium (Ti).

One or more intermediate cases may be provided between the first case 230 and second case 235 of one or both of the first body 200 and second body 205. The first body 200 and second body 205 are typically sized to receive electronic components necessary to support operation of the mobile terminal 100.

The first body 200 is shown having a camera 121 and audio output unit 152, which is configured as a speaker, positioned relative to the display 151. The camera 121 may be constructed such that it can be selectively positioned relative to first body 200 such as by rotation or, swiveling.

The function keys 210 are positioned adjacent to a lower side of the display 151, which is shown implemented as an LCD or OLED. The display may also be configured as a touch screen having an underlying touchpad which generates signals responsive to user contact with the touchscreen, such as with a finger or stylus.

The second body 205 is shown having a microphone 122 positioned adjacent to the keypad 215 and having side keys 245, which are one type of a user input unit as mentioned above, positioned along the side of second body 205. Preferably, the side keys 245 may be configured as hot keys, such that the side keys are associated with a particular function of the mobile terminal 100. An interface unit 170 is shown positioned adjacent to the side keys 245, and a power supply 190 in a form of a battery is shown located on a lower portion of the second body 205.

Figure 3:
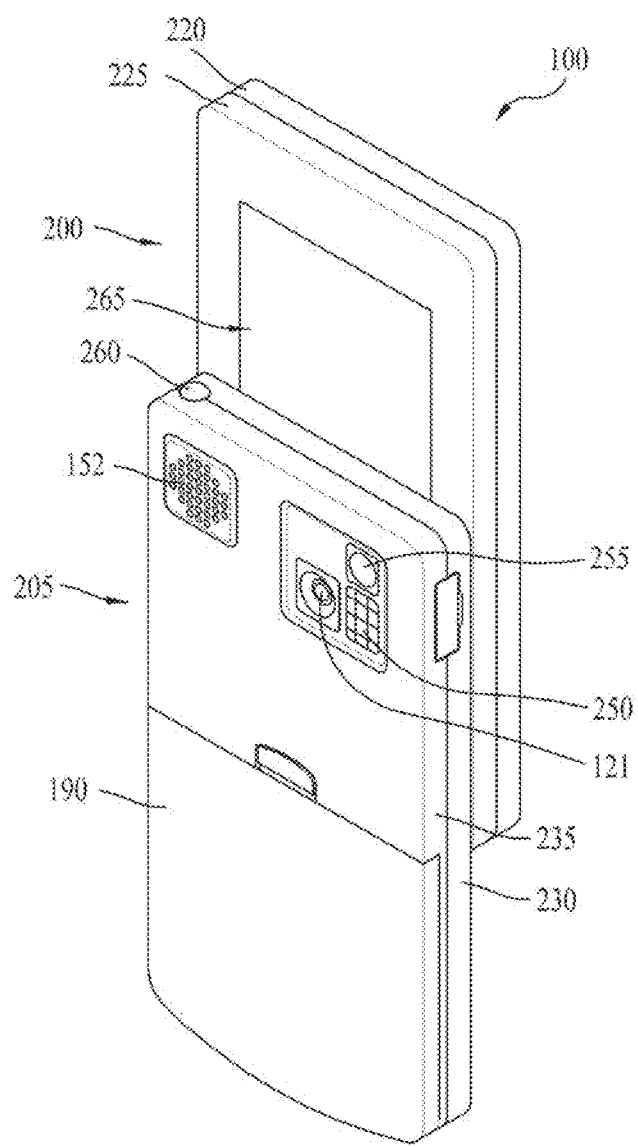
FIG. 3 is a rear perspective diagram of a terminal according to one embodiment of the present invention.

FIG. 3 is a rear view of the mobile terminal 100 shown in FIG. 2. FIG. 3 shows the second body 205 having a camera 121 with an associated flash 250 and mirror 255. The flash 250 operates in conjunction with the camera 121. The mirror 255 is useful for assisting a user to position the camera 121 in a self-portrait mode.

The camera 121 of the second body 205 faces a direction which is opposite to a direction faced by the camera 121 of the first body 200 (FIG. 2). Each of the cameras 121 of the first body 200 and second body 205 may have the same or different capabilities.

In an embodiment, the camera 121 of the first body 200 operates with a relatively lower resolution than the camera 121 of the second body 205. Such an arrangement works well during a video conference, for example, in which reverse link bandwidth capabilities may be limited. The relatively higher resolution of the camera 121 of the second body 205 (FIG. 3) is useful for obtaining higher quality pictures for later use or for communicating with other parties.

The second body 205 also includes an audio output module 152 located on an upper side of the second body and configured as a speaker. The audio output modules 152 of the first body 200 and second body 205 may cooperate to provide stereo output. Moreover, either or both of these audio output modules 152 may be configured to operate as a speakerphone.

A broadcast signal receiving antenna 260 is shown located at an upper end of the second body 205. The antenna 260 functions in cooperation with the broadcast receiving module 111 (FIG. 1). The antenna 260 may be fixed or configured to retract into the second body 205. The rear side of the first body 200 includes a slide module 265, which slidably couples with a corresponding slide module located on the front side of the second body 205.

It is understood that the illustrated arrangement of the various components of the first body 200 and second body 205 may be modified as required or desired. In general, some or all of the components of one body may alternatively be implemented on the other body. In addition, the location and relative positioning of such components are not critical to many embodiments, and therefore, the components may be positioned at locations which differ from those shown by the representative figures.

The mobile terminal 100 of FIGS. 1-3 may be configured to operate within a communication system which transmits data via frames or packets, including both wireless and wired communication systems, and satellite-based communication systems. Such communication systems utilize different air interfaces and/or physical layers.

Examples of air interfaces utilized by the communication systems include example, frequency division multiple access (FDMA), time division multiple access (TDMA), code division multiple access (CDMA), the universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
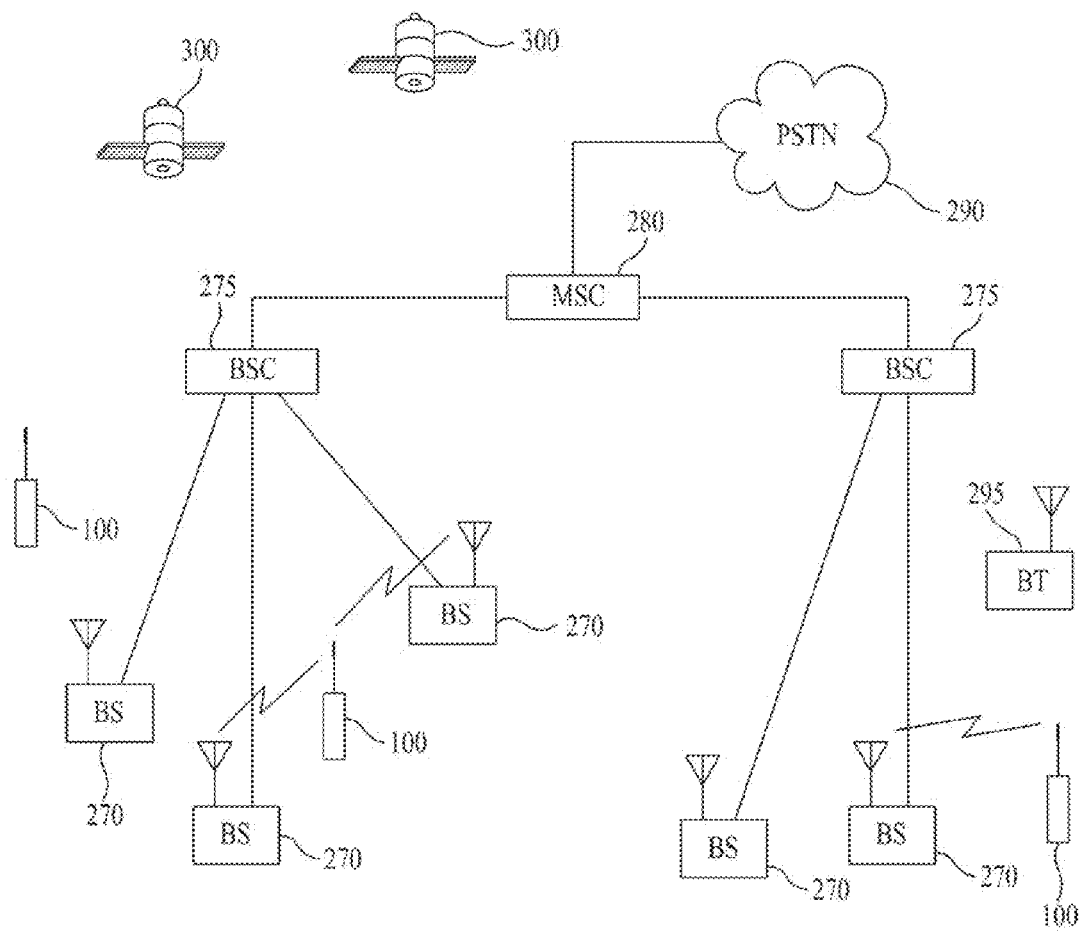
FIG. 4 is a schematic diagram of configuration of a wireless communication system for a terminal according to one embodiment of the present invention.

Referring to FIG. 4, a CDMA wireless communication system is shown having a plurality of mobile terminals 100, a plurality of base stations 270, a plurality of base station controllers (BSCs) 275, and a mobile switching center (MSC) 280.

The MSC 280 is configured to interface with a conventional public switch telephone network (PSTN) 290. The MSC 280 is also configured to interface with the BSCs 275.

The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations 270 may also be denoted as "cell sites." Alternatively, individual sectors of a given base station 270 may be referred to as cell sites.

A terrestrial digital multimedia broadcasting (DMB) transmitter 295 is shown broadcasting to mobile terminals 100 operating within the system. The broadcast receiving module 111 (FIG. 1) of the mobile terminal 100 is typically configured to receive broadcast signals transmitted by the DMB transmitter 295. Similar arrangements may be implemented for other types of broadcast and multicast signaling as discussed above.

FIG. 4 further depicts several global positioning system (GPS) satellites 300. Such satellites facilitate locating the position of some or all of the mobile terminals 100. Two satellites are depicted, but it is understood that useful positioning information may be obtained with greater or fewer satellites.

The position-location module 115 (FIG. 1) of the mobile terminal 100 is typically configured to cooperate with the satellites 300 to obtain desired position information. It is to be appreciated that other types of position detection technology, such as location technology that may be used in addition to or instead of GPS location technology, may alternatively be implemented. Some or all of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 engage in calls, messaging, and other communications.

Each reverse-link signal received by a given base station 270 is processed within that base station 270. The resulting data is forwarded to an associated BSC 275.

The BSC 275 provides call resource allocation and mobility management functionality including soft handoffs between the base stations 270. The BSCs 275 also route the received data to the MSC 280, which provides additional routing services for interfacing with the PSTN 290.

Similarly, the PSTN interfaces with the MSC 280, and the MSC 280 interfaces with the BSCs 275. The BSCs 275 control the base stations 270 to transmit sets of forward-link signals to the mobile terminals 100.

First of all, a method of displaying an image using a relation between a proximity touch and a real touch is explained as follows.

Figure 5:
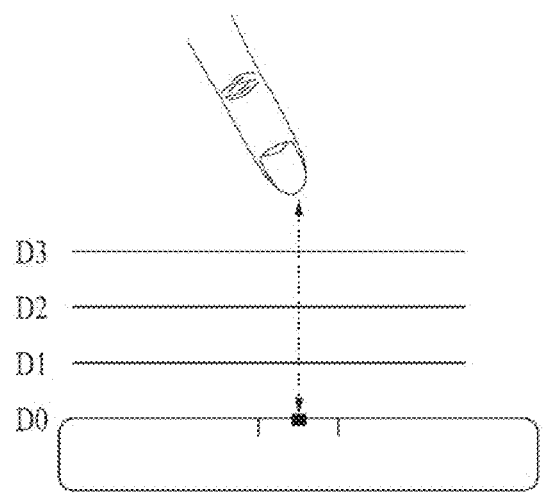
FIG. 5 is a diagram for an example to explain operations of a proximity touch.

FIG. 5 is a diagram for a principle of a proximity touch.

Referring to FIG. 5, a proximity touch means a case that a pointer approaches a screen in a distance without being actually touched to the screen. In this case, the pointer is a tool for being touched to a specific portion of a displayed image really or in proximity. For instance, the pointer includes such a tool as a stylus pen, a finger and the like. In this disclosure, 'proximity-touched' means that a proximity touch is recognized in a manner that a pointer is located at a position above a space vertically opposing a prescribed point of a surface of the touchscreen.

In this case, the controller 180 is able to recognize the proximity touch as a prescribed signal input. In particular, the mobile terminal 100 according to one embodiment of the present invention is able to recognize a proximity touch if a pointer approaches within a range of a prescribed distance from a screen. In this case, the prescribed distance may mean a vertical distance between the pointer and the screen.

In particular, 'D0' indicates a real touch, while 'D1', 'D2' or 'D3' indicates a proximity touch in a prescribed vertical distance from a screen. In this example, three positions are illustrated. Values of the three positions are variable with consideration of a sensitivity of a sensor and the like.

Real touch means that a pointer is really touched to a screen. In this case, the controller 180 is able to recognize the real touch as a prescribed signal input. This can be implemented in a mobile terminal 100 having a touchscreen.

In particular, the mobile terminal 100 according to one embodiment of the present invention is able to detect a proximity touch or a real touch through the sensing unit 140.

In this case, the sensing unit 140 is able to include various sensors to perform various sensing functions. For instance, the sensing unit 140 can include a proximity sensor or a haptic sensor to detect a proximity touch or a real touch.

Proximity sensor means a proximity switch that detects an object approaching a detection surface of a switch or a presence or non-presence of an object in the vicinity using an electromagnetic force or an infrared ray without mechanical contact. And, the proximity switch means a switch that generates an ON/OFF output instead of generating an ON/OFF output through mechanical contact if a detected object comes within a range of a detection distance determined for each sensor without mechanical contact. Therefore, the proximity switch has a durability considerably longer than that of a contact-type switch and is highly applicable for practical use.

An operational principle of the proximity switch is explained as follows. First of all, when an oscillation circuit oscillates with a full-wave radio frequency, if an object approaches a sensor detection surface in proximity, an amplitude of the oscillation circuit attenuates or stops. This change is converted to an electric signal to detect a presence or non-presence of the object. Therefore, even if any non-metallic substance lies between a radio frequency oscillation proximity switch and a specific object, the proximity switch is able to detect the specific object without interference with the substance.

Haptic sensor means a sensor that detects a contact of a specific object to an extent of a human-sensible level or higher. The haptic sensor is capable of detecting such information as roughness of a contact surface, hardness of a contact object, a temperature of a contact point, and the like.

Meanwhile, the sensing unit 140 is able to detect a proximity distance or a proximity speed. In this case, the proximity distance means a distance between a surface of a touchscreen and a pointer. In particular, the proximity distance may mean a shortest distance between a screen and a pointer. The proximity speed means a speed of a pointer approaching a screen in proximity or a speed of a pointer getting away from a screen.

In the following description, how to control actions of avatar displayed on a touchscreen and operations associated with the actions are exemplarily explained to describe operations of the present invention, which is non-limited to an operational control of avatar. And, it is understood that various symbols displayed on a touchscreen as well as avatars are controllable.

Figure 6A:
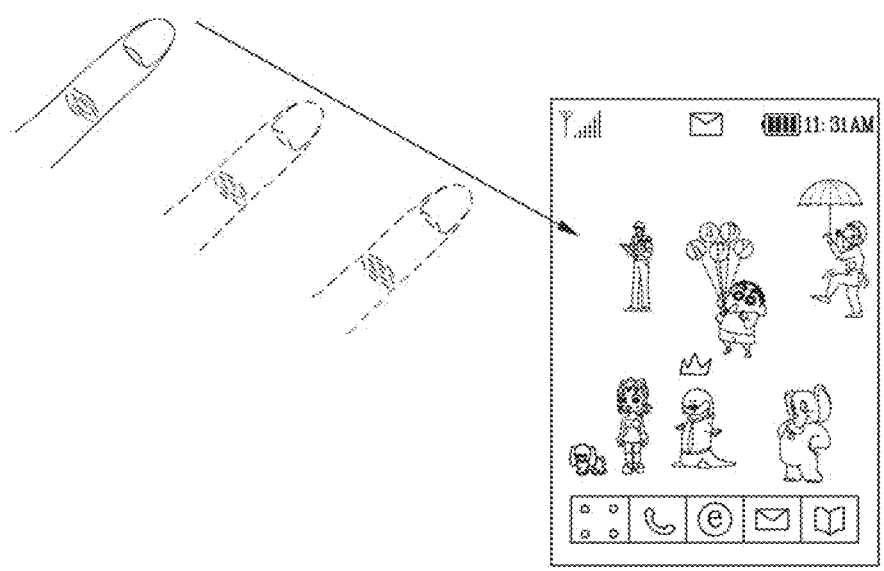
FIGS. 6A-6C are diagrams for an example of a screen according to one embodiment of the present invention.
Figure 6B:
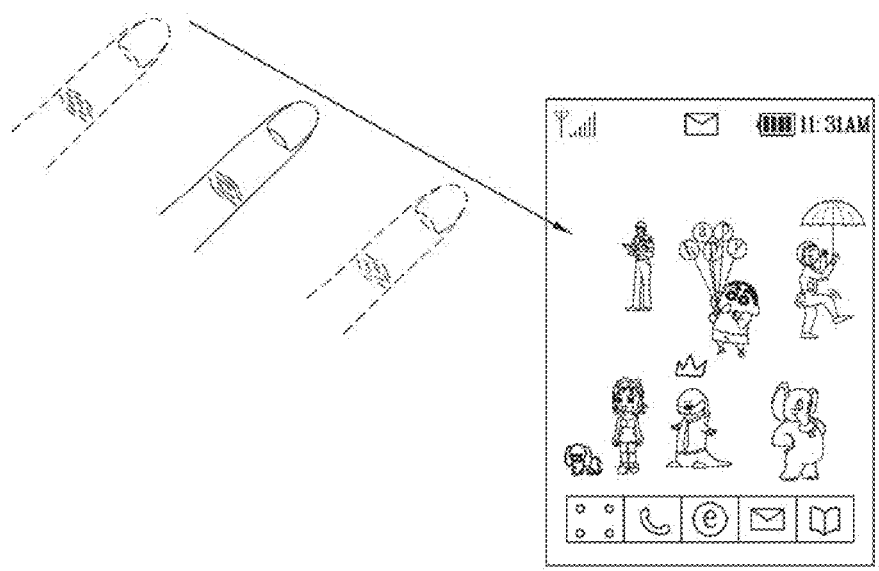
Figure 6C:
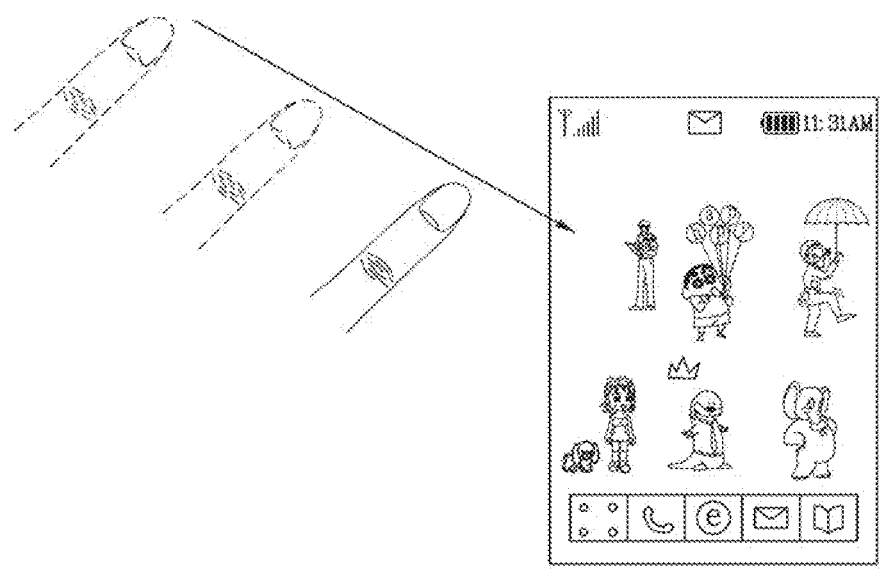

FIGS. 6A to 6C exemplarily show that motions of avatars displayed on a touchscreen react to proximity of a pointer.

FIG. 6A shows a case that a pointer (e.g., a finger) is located between D3 (farthest from a contact surface D1) and D2 among proximity touch regions D0, D1, D2 and D3 shown in FIG. 5.

Referring to FIG. 6, all avatars displayed on a touchscreen react to a pointer approaching a surface of the touchscreen. In particular, all avatars stare at the pointer approaching the touchscreen.

If the pointer is located at D2, the avatars within a predetermined region of the pointer-located point face the pointer and the rest of the avatars return to their original postures.

If the pointer approaches D1, the avatar located at the pointer-located point faces the pointer only. In this case, other avatars except the selected avatar return to their original postures.

Meanwhile, if the avatar included in the pointer-approaching region is an animal, it faces the pointer only in case of D3 but is able to take an action of strolling by wagging its tail to be selected in case of D2. Moreover, in D1, an animal sound is outputted through a speaker while the avatar acts by wagging its tail. And, it is also able to indicate that the animal avatar is reacting using a vibration motor.

In case that the avatar included in the pointer-approaching region is a plant, the plant avatar faces the pointer in D3 only. The plant avatar is swaying in D2 slowly. The plant avatar is swaying fast in D1.

Figure 7:
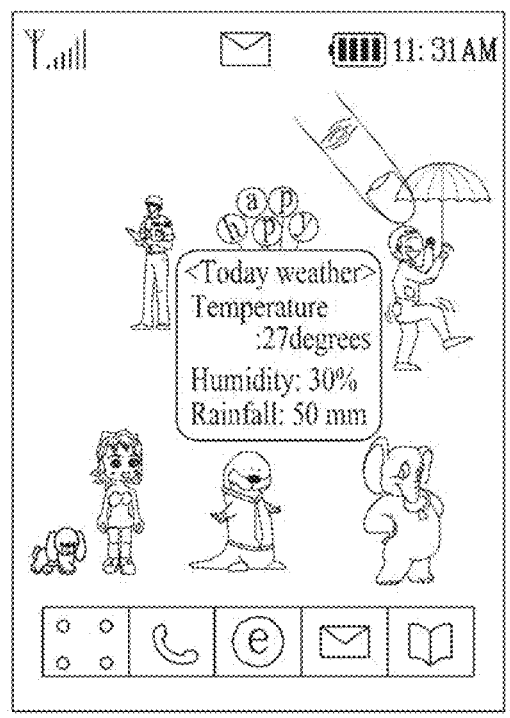
FIG. 7 is a diagram for an example of a screen according to another embodiment of the present invention.

FIG. 7 is a diagram for an example of a screen according to another embodiment of the present invention.

Referring to FIG. 7, an avatar is displayed on a touchscreen by reflecting externally received data relevant to the displayed avatar.

For instance, if there is an avatar corresponding to a user, today weather information received by wireless internet or the like is brought to reflect a state avatar corresponding to a specific weather on the user avatar. In particular, if an avatar is approached in proximity, it is able to display weather information including a current temperature, humidity, rainfall and the like using a pop-up window.

Figure 8:
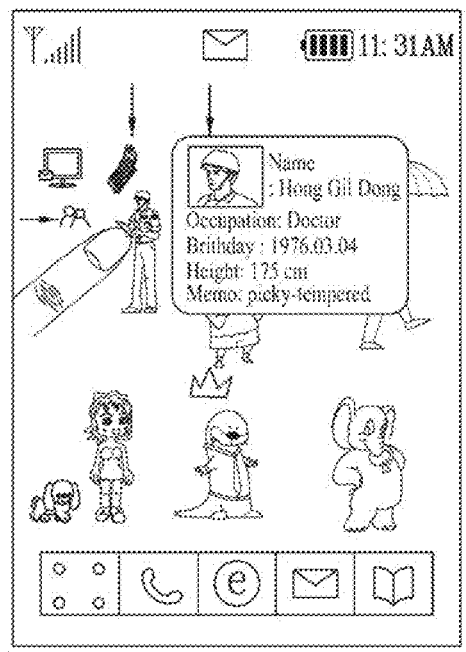
FIG. 8 is a diagram for an example of a screen according to another embodiment of the present invention.

FIG. 8 is a diagram for an example of a screen according to another embodiment of the present invention.

Referring to FIG. 8, regarding a human avatar, if a point of D1 is approached, information on a person matching the corresponding avatar is displayed using a pop-up window. The personal information can include a picture stored in a phonebook, a setup group, user-inputted information and the like.

Icons for performing operations of SMS/MMS/Email, call, IM and the like appear around the proximity-touched avatar. An envelop icon is used as the icon indicating the SMS/MMS/Email. A mobile phone icon is used as the icon indicating the call. AMSN icon is used as the icon indicating the instant messenger for example.

In case of the instant messenger, different icons are used to discriminate a case that a correspondent party is not logged in from a case that a correspondent party is logged in (i.e., according to states provided by the messenger).

Meanwhile, if viewable and selectable icons are approached in proximity, the proximate icon or an information window remains only and the rest of the icons disappear. If a pointer is shifted to a human avatar again, the entire icons appear again.

If it is detected that a pointer is located within a range of a prescribed distance over the icon, a controller displays a function associated with the icon in a pop-up form and then controls an operation according to a selection of a pop-up menu to be implemented.

Figure 9:
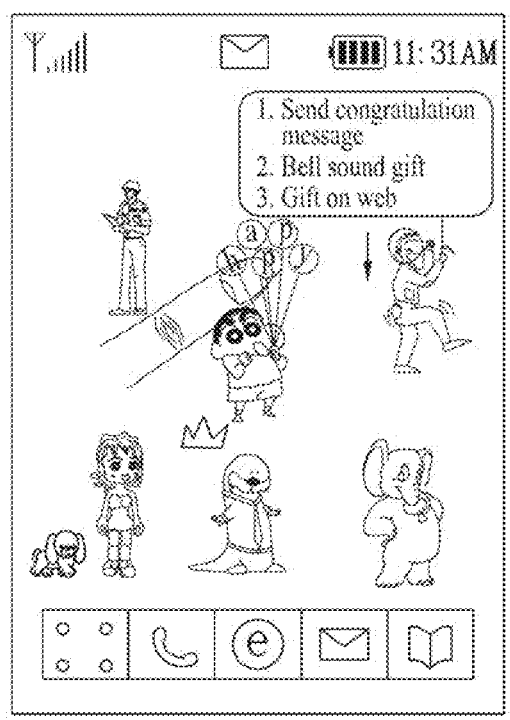
FIG. 9 is a diagram for an example of a screen according to another embodiment of the present invention.

FIG. 9 is a diagram for an example of a screen according to another embodiment of the present invention.

Referring to FIG. 9, while a proximity touch to at least one avatar is not released, if a pointer is shifted to another avatar, a controller controls a function associated with the latter avatar to be performed on a target person of the at least one avatar from which the proximity touch is not released. In particular, if it is a birthday of a person corresponding to an avatar, a specific avatar (e.g., a balloon) indicating a birthday is displayed to inform a user that it is the birthday of the person corresponding to the avatar.

If a pointer approaches a position of D1 for an avatar, person information or the like is displayed. In this case, if a balloon avatar indicating a birthday is approached in proximity, a menu for sending a congratulation message or a menu for giving a present or the like is displayed. If the congratulation message is approached in proximity, common texts relevant to various kinds of congratulations are displayed. If a user makes a selection (touch), a message is automatically sent. If a menu for making a bell sound gift or a menu for making a gift on web is approached in proximity, relevant sites are displayed. If one of the relevant sites are selected (touched), the corresponding site is directly entered to enable a user to purchase a gift.

Figure 10:
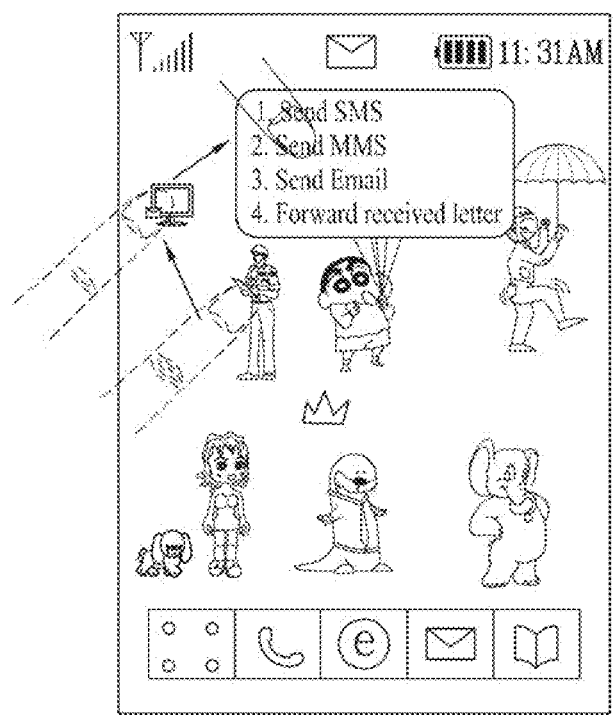
FIG. 10 is a diagram for an example of a screen according to another embodiment of the present invention.

FIG. 10 is a diagram for an example of a screen according to another embodiment of the present invention.

Referring to FIG. 10, for a human avatar, if a position D1 is approached, icons for enabling operations of SMS/MMS/Email, call, IM (instant messenger) and the like appear around the avatar. If a pointer is shifted over the corresponding icon, functions associated with the icon are displayed in a pop-up form.

If a user touches a menu on the pop-up window, an image or menu for enabling a selected function is entered. Instead of approaching an icon in proximity, if the icon is directly touched, an associated image or menu is entered.

In case that an icon really touched by a user is a telephone icon, a menu for making a call to home, a menu for making a call to a mobile phone, a menu for a call history, and the like are displayed.

In case of a messenger icon, if a user is in a log-in state, a menu for a text chatting, a video chatting or the like is displayed. If a user is in a log-out state, a menu for sending a note, a menu for viewing recent chatting contents or the like is displayed. If a menu for viewing a received letter is selected in proximity, a most recently received content is displayed in a pop-up form like a preview function. If the recent chatting content viewing is selected, a most recently received chatting content is displayed.

Figure 11:
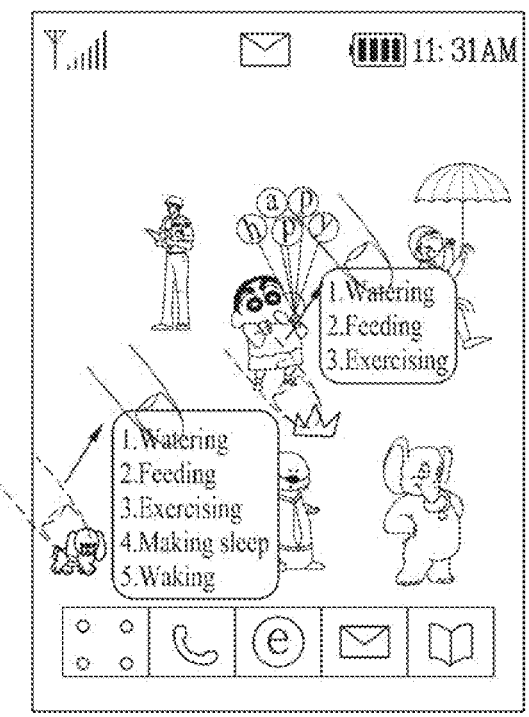
FIG. 11 is a diagram for an example of a screen according to another embodiment of the present invention.

FIG. 11 is a diagram for an example of a screen according to another embodiment of the present invention.

Referring to FIG. 11, for an animal avatar, if a position D1 is approached, a menu for information on such activity for raising each animal as watering, feeding, exercising and the like is displayed as a pop-up window. If a user selects (touches) an activity menu, an avatar corresponding to the user appears and then performs an action for watering or feeding an animal.

For a plant avatar, a menu for information on activity for raising a plant is displayed as activity menus. If the menu is touched, a user avatar performs a selected action.

In case of proximity, a user avatar approaches to perform an action for the corresponding activity.

If a pointer is shifted toward the animal or plant avatar, the user avatar goes back to a previous position.

If watering or feeding is not appropriately performed on a plant or animal, the plant or animal may die. For instance, a cactus may die if watering is frequently performed. Features of an animal/plant corresponding to a real animal/plant are reflected as they are. Thus, behaviors in reality should be exactly performed to make the animal/plant grow well.

FIG. 12 is a diagram for an example of a screen according to another embodiment of the present invention.

Referring to FIG. 12, as mentioned in the foregoing description, the present invention enables an action of pressing a button using a proximity position and a proximity speed. If an action of moving a pointer up and down is performed within a range of D1, D2 and D3, which is a proximity touch detected position, at a predetermined speed for a predetermined duration, the corresponding speed is recognized to enable a specific operation to be performed according to the speed.

For instance, assume a case that a pop-up window indicating information on a person is generated by proximity-touching a person avatar. If it is necessary to display information having a size greater than a size of a pop-up window, it is able to display a mark indicating that there exist more contents in a top and/or bottom (left and/or right) within the pop-up window.

For instance, when such an icon as an arrow is displayed, if a user changes a position at a predetermined speed between proximity positions D1, D2 and D3, the same action of pressing a button is recognized. In particular, processing for a user-selected icon is performed according to a proximity position change such as D3→D2→D3 or a proximity position change such as D2→D1→D2.

Figure 12A:
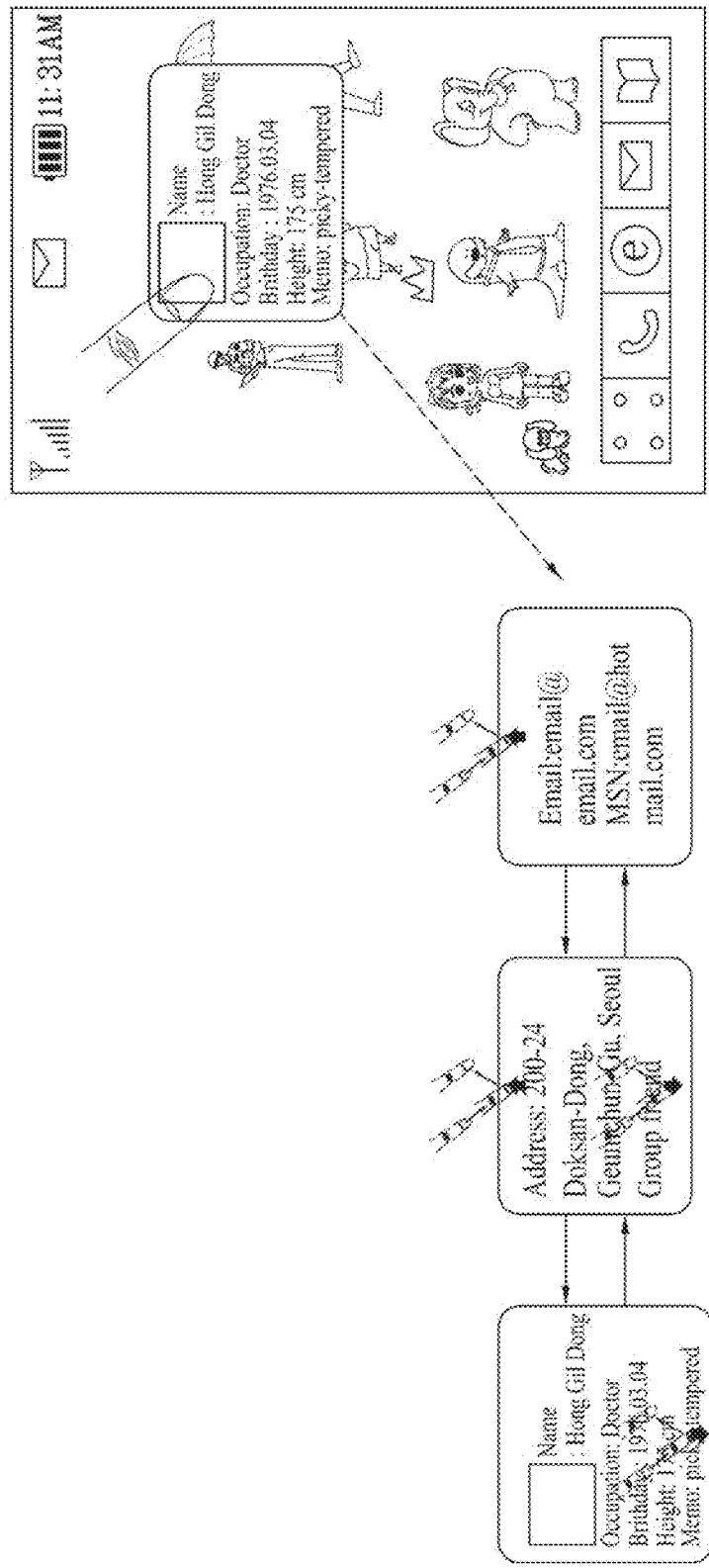
FIGS. 12A and 12B are diagrams for an example of a screen according to another embodiment of the present invention.

Referring to FIG. 12A, if a pointer is proximity-touched to a person avatar, as shown in FIG. 8, a pop-up window page indicating information on a person is displayed. Looking into a pop-up window (a), it can be observed that an arrow appears on a bottom part of the pop-up window. This indicates that sub-information further exists.

If a user needs the sub-information, the user presses or proximity-touches the arrow displayed on the bottom part within the pop-up window. If so, the pop-up window changed into (b). In particular, a sub-content of (a) or connected information is displayed. If there is a sub-content of the pop-up window (b) or information continuously exists, an arrow is displayed on a bottom end of the pop-up window. Of course, it is understood that an arrow to return to an upper position, i.e., the image (a), is displayed on the top of the pop-up window. If the top arrow is pressed or proximity-touched in the pop-up window (b), the pop-up window (a) is displayed. If the bottom arrow is pressed or proximity-touched in the pop-up window (b), a pop-up window (c) is displayed. If there is no more information below the pop-up window (c), the bottom arrow is not displayed.

Figure 12B:
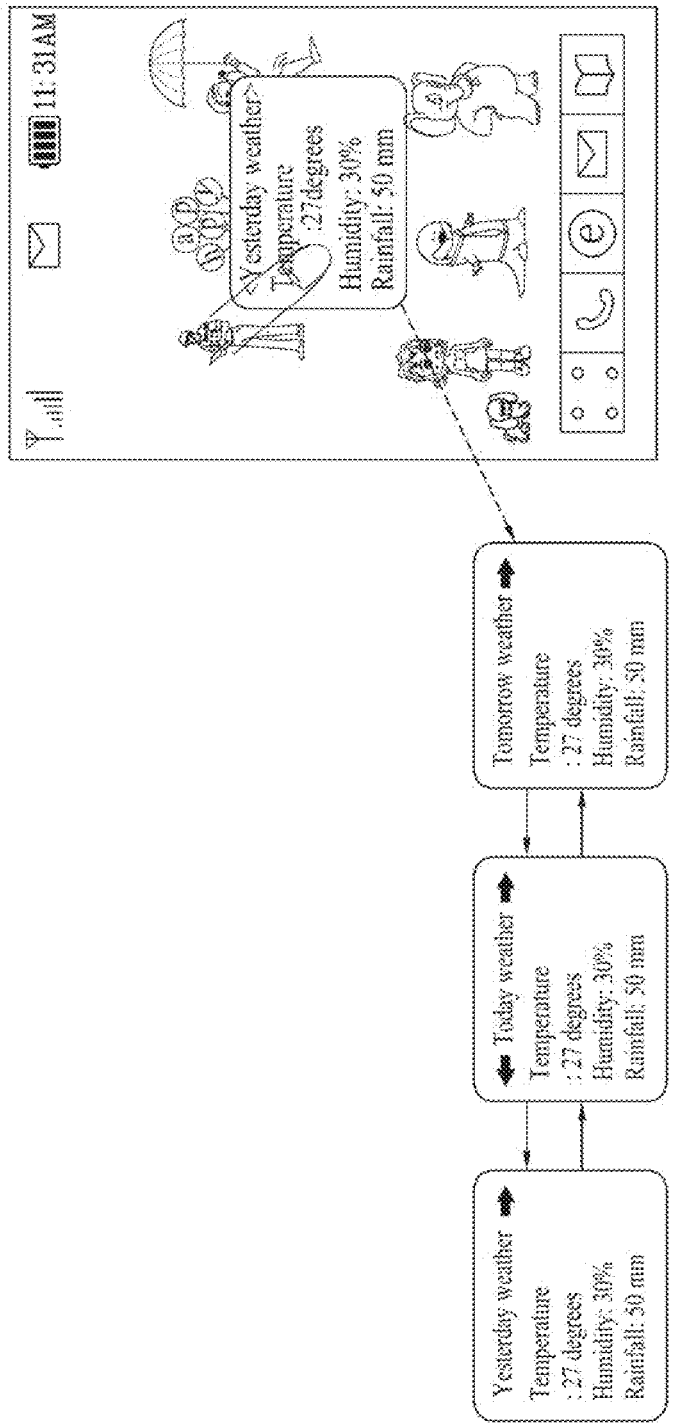

Referring to FIG. 12B, when a proximity touch is performed on an avatar, as shown in FIG. 7, weather information is displayed. This is performed in a manner similar to that shown in FIG. 12A. Arrows are displayed on right and left sides of a pop-up window (b) including today weather information.

In particular, if a left arrow is pressed or proximity-touched, a pop-up window (a) representing yesterday weather information is displayed. If a left arrow is pressed or proximity-touched, a pop-up window (c) representing tomorrow weather information is displayed.

Figure 13:
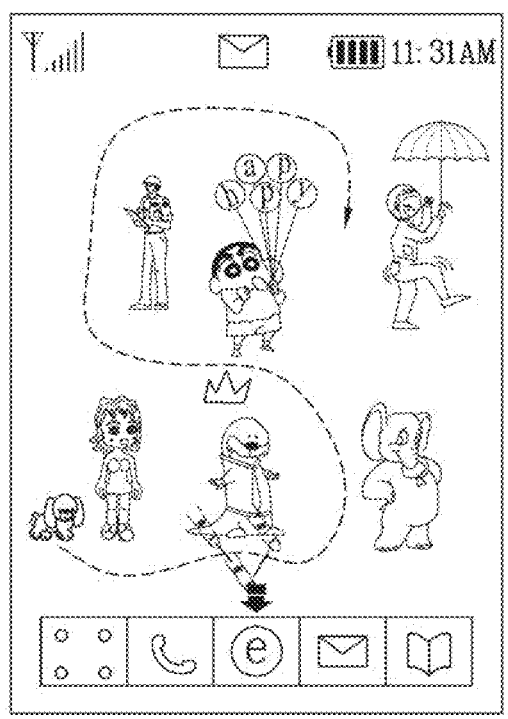
FIG. 13 is a diagram for an example of a screen according to a further embodiment of the present invention.

FIG. 13 is a diagram for an example of a screen according to a further embodiment of the present invention.

Referring to FIG. 13, as mentioned in the foregoing description, such an action as pressing a button using a proximity position and speed can be performed. If an action of moving upward and downward within a range of D1, D2 and D3 is performed at a predetermined speed for a predetermined time, it is recognized as performing an action of pressing a button. Hence, a specific operation can be performed.

Looking into the example shown in FIG. 11, actions for raising an animal avatar are performed. If a user selects an exercising menu, the following action is displayed. First of all, a corresponding animal avatar moves around at a normal speed. A pop-up window for adjusting a level of exercise can be displayed. If a pointer is moved up and down fast on this pop-up window, the animal is displayed as running or wandering fast. If the pointer is moved slowly, the animal is displayed as wandering slow.

If a user selects a petting menu or a patting menu, the following action is displayed. First of all, a user avatar approaches a corresponding animal/plan avatar and then performs a petting or patting action. In this case, it is able to adjust a level of this action using a pop-up window. And, it is able to display a reaction of an animal/plant according to a moving speed of the pointer.

Figure 14:
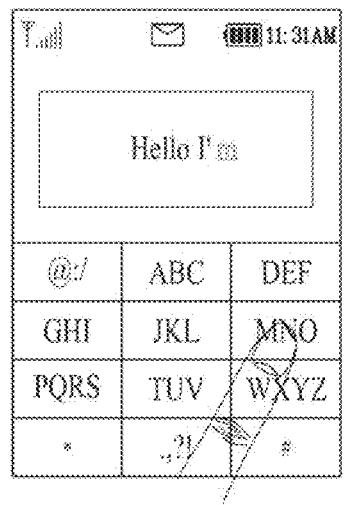
FIG. 14 is a diagram for an example of an implementation of a character pre-displaying function by a proximity touch.

FIG. 14 is a diagram for an example of an implementation of a character pre-displaying function by a proximity touch.

Referring to FIG. 14, an input of 'Hello I' is completed. And, 'm' is about to be inputted. If a user brings a pointer (or, a finger) to get closer to a button (or, a key), to which characters 'MNO' are allocated, in a distance enough to be recognized as a proximity touch, each of the characters allocated to the button to be selected is displayed in advance through the text input window. Therefore, the user is able to preview a character to input next, whereby time can be saved by reducing a miskeying error.

Character can be selected in two ways. First of all, a character displayed on a text input window is selected by a real touch. Secondly, if a user attempts to select a pre-displayed character in a proximity-touch state, a proximity touch is released.

Figure 15:
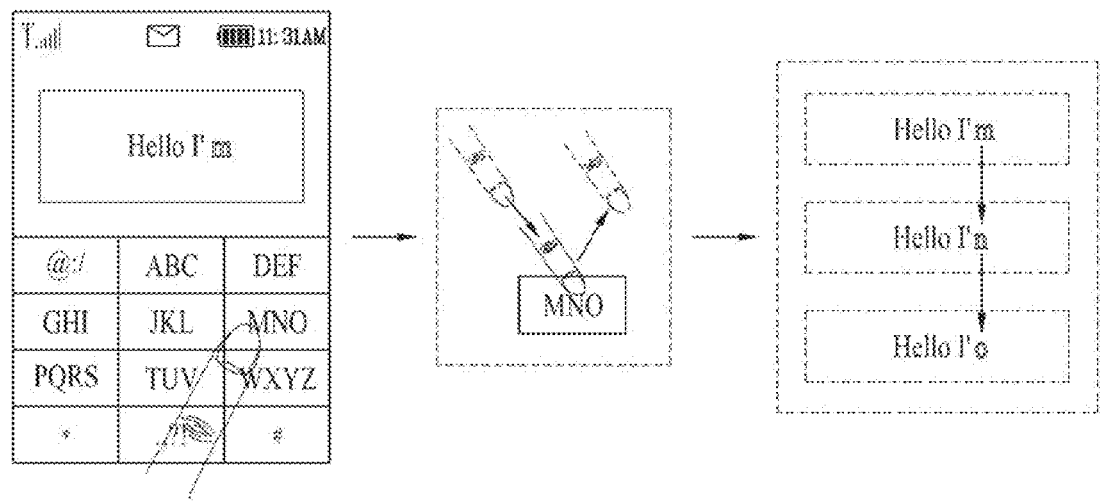
FIG. 15 is a diagram for a character inputting method according to one embodiment of the present invention.

FIG. 15 is a diagram for a character inputting method according to one embodiment of the present invention.

Referring to FIG. 15, several characters are allocated to one key in general. When characters are inputted, if a corresponding button keeps being pressed for predetermined duration, the allocated characters are inputted in a manner of being switched to one another.

If a finger approaches a character to input using a proximity touch, a first allocated character is displayed. If the finger is moved up and down without being touched, the allocated characters are displayed by being switched to one another. If the finger is touched to a button, the corresponding character is inputted. If the finger moves away from a range of D3, an original state is entered. If an action of moving the finger up, down and up at predetermined speed in a predetermined time within a proximity touch detection range (D, D2, D3) shown in FIG. 5, it is recognized as performing an action of pressing a button. Therefore, it is able to perform an action as if pressing a button.

Figure 16:
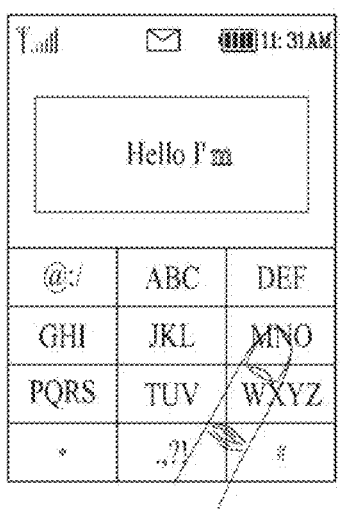
FIG. 16 is a diagram for a character inputting method according to another embodiment of the present invention.
Figure 16:
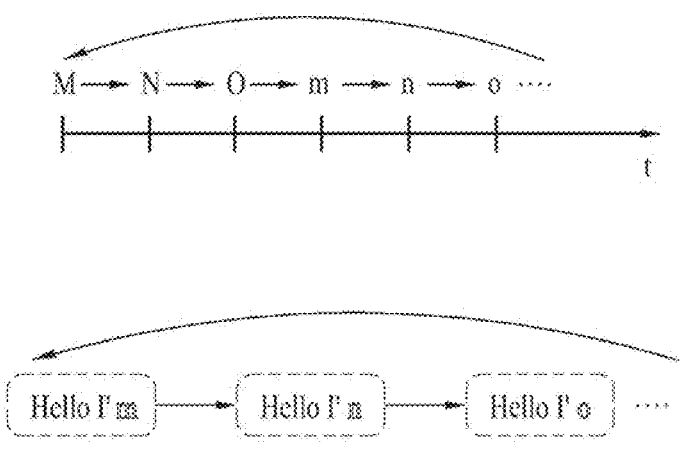

FIG. 16 is a diagram for a character inputting method according to another embodiment of the present invention.

Referring to FIG. 16, if a finger is brought to a character to input using a proximity touch, a first allocated character is displayed. While a touch is not made, allocated character are displayed in sequence according to a time of sustaining this untouched state.

For instance, if a pointer is located on a button for inputting characters 'MNO', the character 'M' is displayed in the first place. After predetermined duration, the character 'N', which is allocated in next order, is displayed. Thus, the characters are sequentially displayed in a cycle of the predetermined duration in order of 'M→N→O→m→n→o→M→N . . . '.

Figure 17:
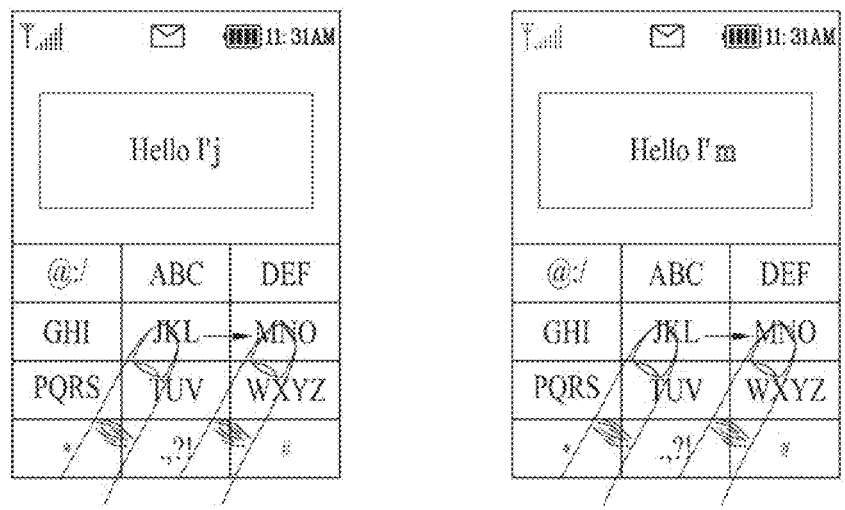
FIG. 17 is a diagram for a character inputting method according to another embodiment of the present invention.

FIG. 17 is a diagram for a character inputting method according to another embodiment of the present invention.

Referring to FIG. 17, this embodiment indicates a case that a pointer is shifted to another button while a proximity touch state is unreleased. In particular, this embodiment relates to an item that should be taken into consideration to prevent an unwanted character from being inputted in case that a release of a proximity touch is recognized as an input. While a proximity touch state is not released, if a pointer is shifted to another button, a character corresponding to the shifted position is displayed in advance through a text input window.

In this case, it is important that a proximity touch region is sustained. As shown in the drawing, while 'l' is displayed in advance on an input window by proximity-touching a 'JKL' button, if a user attempts to input 'm', a pointer is shifted to a 'MNO' button by maintaining a predetermined distance not to deviate from the proximity touch state. If so, 'j' disappears from the input window and a new character 'M' is displayed on the input window in advance. In this case, in order to select a specific 'm', characters can be switched using the change (D1→D2→D1→D2→ . . . ) of the proximity touch detection state by shifting the pointer up and down to expect the same effect of sustaining the proximity touch for predetermined duration or pressing a button in a proximity touch state.

Figure 18:
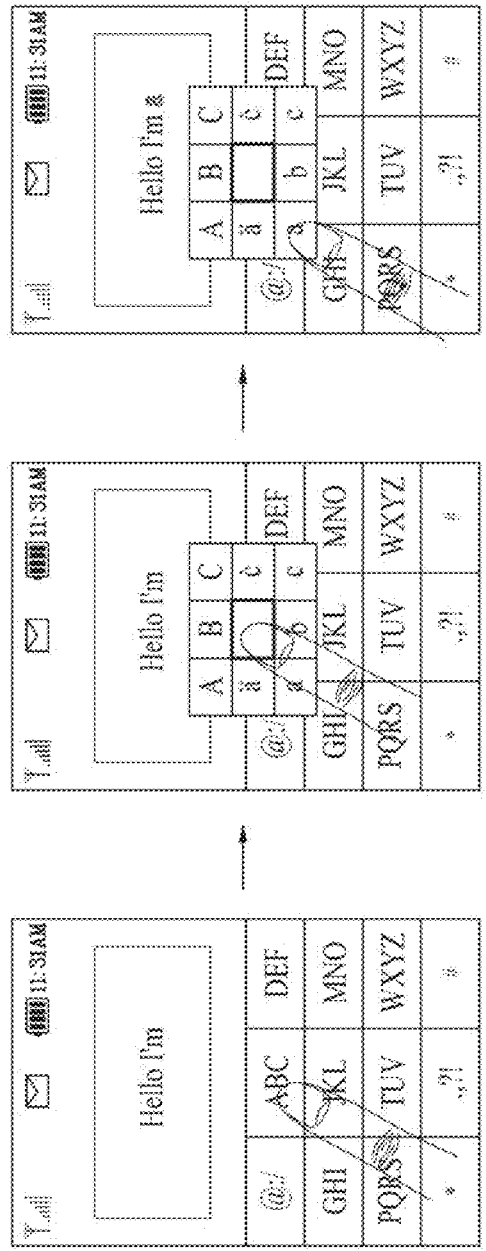
FIG. 18 is a diagram for a character inputting method according to another embodiment of the present invention.

FIG. 18 is a diagram for a character inputting method according to another embodiment of the present invention.

Referring to FIG. 18, it can be observed that all characters allocated to a prescribed key are displayed in advance around a key display region.

For instance, if a proximity touch is performed on a 'ABC' allocated key, as shown in the drawing, all characters 'A, B, C, a, b, c, . . . ' are displayed through a display region. In order to facilitate a shift of a pointer, the characters are preferably displayed in 3×3 form around a proximity-touched key. Meanwhile, if a user attempts a current state to enter a state of Korean language, English-to-Korean transition can be facilitated using a function key separately provided to a lateral side of a terminal body for example. Therefore, it is able to expect an effect of reducing a proximity touch standby time necessary for 'A' to 'c'.

Figure 19:
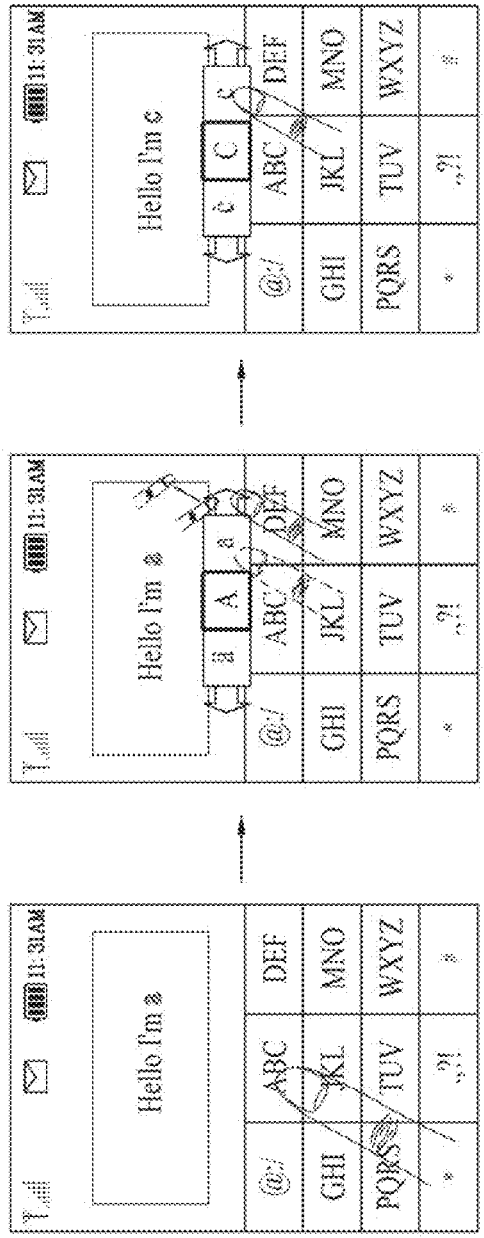
FIG. 19 is a diagram for a character inputting method according to another embodiment of the present invention.

Meanwhile, in case that characters more than those displayed on a keypad are allocated, the same display system as shown in FIG. 19 is available.

FIG. 19 is a diagram for a character inputting method according to another embodiment of the present invention.

Referring to FIG. 19, first of all, basic characters displayed on a keypad are displayed. In this case, in order to indicate that a plurality of characters are further allocated, arrows are displayed around a corresponding key. If a proximity touch or a contact touch is performed on the arrow, corresponding characters are displayed.

For instance, 'A, B, C, a, b, c, . . . ' is allocated to a 'ABC' key. According to the present embodiment, if a proximity touch is performed on the 'ABC' key, 'a, A, α' is displayed and arrows are displayed on both right and left sides of 'a, A, α' to indicate that there are more allocated characters. If a user wants 'c', a proximity touch or a real touch is performed on the right arrow. If 'c, C, γ' is displayed through 'b, B, β', a specific character 'c' is selected. Of course, a character 'c' is displayed in advance in a form different from that of another character on a screen according to a proximity touch to 'c'.

Figure 20:
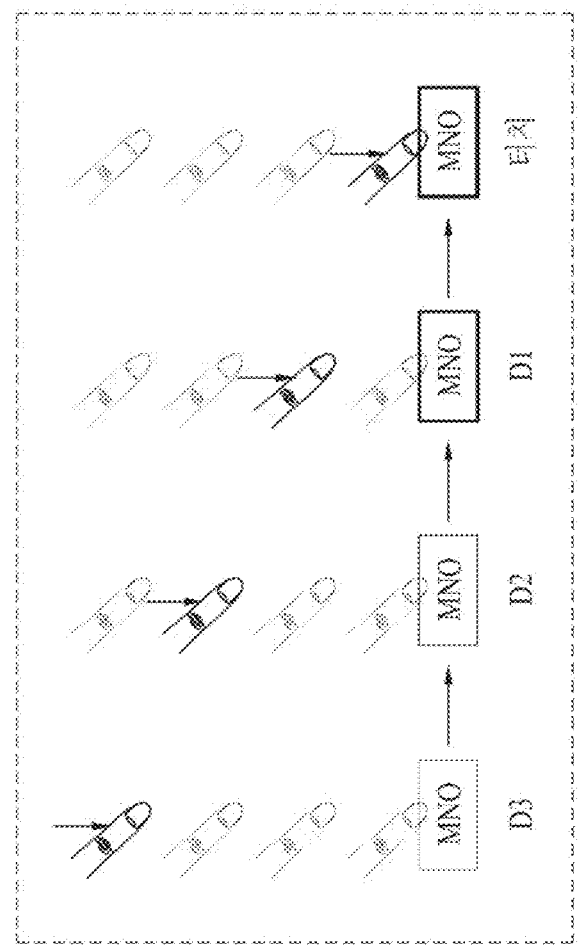
FIG. 20 is a diagram for a character inputting method according to a further embodiment of the present invention.

FIG. 20 is a diagram for a character inputting method according to a further embodiment of the present invention.

Referring to FIG. 20, a size of vibration varies according to a speed of approaching a contact point of a real touch like a distance 'D3→D2→D1→D0' of a proximity touch. If a different vibration effect is brought according to each action by discriminating a case of touching a corresponding character strongly from a case of touching a corresponding character weakly in inputting the character, a user is able to recognize that the touch is made strong or weak.

If a pointer is shifted fast to a real touch contact point from D3, a touch point is pressed strongly at the moment of performing a touch really. If a pointer is shifted slowly, a touch position is pressed weaker than the case of moving the pointer fast. Using this, if a shift is made fast, strong or rough vibration is provided. If a shift is made slow, weak and smooth vibration is provided. Therefore, a user is able to recognize a case of pressing a button strongly or weakly.

Meanwhile, a visual effect can be given to a keypad screen of a touchscreen in a manner that a button is pressed according to a proximity touch. Generally, when a character is inputted, if an elastic button is pressed, a user can see that a projected button is pressed down. By representing this effect using the proximity touch, a user can be provided with an effect of pressing a button. In particular, since each step from D3 to a real touch contact point is recognizable, an image effect can be provided as follows. First of all, a button remains intact at D3. The button seems to be embedded slightly at D2. And, the button seems to be completely embedded at D1 as if fully pressed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile communication terminal comprising:
a touchscreen configured to display prescribed data and to detect a real touch or a proximity touch to a surface contact point;
a proximity sensor configured to sense a proximity position of a proximate object and output a proximity signal corresponding to the proximity position of the proximate object; and
a controller configured to control an implementation of an operation associated with the displayed prescribed data according to the proximity signal output by the proximity sensor,
wherein the prescribed data comprise at least one avatar and a second avatar, and
wherein the controller is further configured to control an implementation of a specific operation on information of the at least one avatar, wherein the specific operation implemented on the information of the at least one avatar is associated with the second avatar, when the proximity sensor senses movement of the proximate object from a position corresponding to the at least one avatar to a position corresponding to the second avatar.

2. The mobile communication terminal of claim 1, wherein the controller is further configured to control the touchscreen to display at least one menu information for implementing the specific operation around the second avatar when the proximity sensor senses the movement of the proximate object from the position corresponding to the at least one avatar to the position corresponding to the second avatar.

3. The mobile communication terminal of claim 2, wherein the at least one menu information is displayed as at least one selected from the group consisting of a short text message icon, a multimedia message icon, an Email icon and an instant messenger icon.

4. The mobile communication terminal of claim 2, wherein the at least one menu information is displayed in a pop-up form.

5. The mobile communication terminal of claim 1, wherein the prescribed data further comprise a text input window for writing a short text message.

6. The mobile communication terminal of claim 5, wherein the controller is further configured to control the touchscreen to display a plurality of characters allocated to a proximity target key button around a key display region in advance according to the proximity signal output by the proximity sensor.

7. The mobile communication terminal of claim 6, wherein the controller is further configured to control the touchscreen to display a corresponding character on an input window in advance according to a proximity signal for a character of the plurality of characters displayed around the key display region.

8. The mobile communication terminal of claim 7, wherein the controller controls a key button pressed form to be displayed according to a proximity distance from the surface contact point of the touchscreen.

9. The mobile communication terminal of claim 7, wherein if a real touch is made to a contact point, the controller controls a corresponding operation.

10. The mobile communication terminal of claim 5, wherein the controller controls a character displayed in advance on an input window according to a proximity distance from the surface contact point of the touchscreen.

11. A method of controlling a display in a mobile communication terminal having a proximity sensor, the method comprising:

displaying prescribed data on a touchscreen, the prescribed data comprising at least one avatar and a second avatar;
detecting, using the proximity sensor, a proximity touch to the prescribed data displayed on the touchscreen; and
controlling a corresponding operation if a proximity touch detection condition is met,
wherein controlling the corresponding operation comprises performing a specific operation on information of the at least one avatar, wherein the specific operation performed on the information of the at least one avatar is associated with the second avatar, when the proximity sensor detects movement of the proximity touch from a position corresponding to the at least one avatar to a position corresponding to the second avatar.

12. The method of claim 11, further comprising controlling the touchscreen to display at least one menu information for implementing the specific operation around the second avatar when the proximity sensor detects the movement of the proximity touch from the position corresponding to the at least one avatar to the position corresponding to the second avatar.

13. The method of claim 12, wherein the at least one menu information is displayed as at least one selected from the group consisting of a short text message icon, a multimedia message icon, an Email icon and an instant messenger icon.

14. The method of claim 12, wherein the at least one menu information is displayed in a pop-up form.

15. The method of claim 11, wherein the prescribed data further comprises a text input window for writing a short text message.

16. The method of claim 15, further comprising displaying a plurality of characters allocated to a proximity target key button around a key display region in advance according to the proximity signal output by the proximity sensor.

17. The method of claim 16, further comprising displaying a corresponding character on an input window in advance according to a proximity signal for a character of the plurality of characters displayed around the key display region.

18. The method of claim 17, wherein a key button pressed form is controlled to be displayed according to a proximity distance from a surface contact point of the touchscreen.

19. The method of claim 15, further comprising controlling a character displayed in advance on an input window according to a proximity distance from a surface contact point of the touchscreen.

20. The method of claim 11, wherein the proximity touch detection condition is based on a distance from a contact point and a sustained time of the distance.

* * * * *